United States Patent
Loster et al.

(10) Patent No.: US 11,438,224 B1
(45) Date of Patent: Sep. 6, 2022

(54) SYSTEMS AND METHODS FOR SYNCHRONIZING CONFIGURATIONS ACROSS MULTIPLE COMPUTING CLUSTERS

(71) Applicant: BANK OF AMERICA CORPORATION, Charlotte, NC (US)

(72) Inventors: Leonard A. Loster, Arlington Heights, IL (US); Manikumar Juttukonda, Saint Augustine, FL (US); Stacy D. Glover, Winston Salem, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/576,505

(22) Filed: Jan. 14, 2022

(51) Int. Cl.
*H04L 41/0803* (2022.01)
*H04L 67/1095* (2022.01)
*H04L 41/22* (2022.01)

(52) U.S. Cl.
CPC .......... *H04L 41/0803* (2013.01); *H04L 41/22* (2013.01); *H04L 67/1095* (2013.01)

(58) Field of Classification Search
CPC ............. H04L 41/0803; H04L 41/0813; H04L 41/0816; H04L 41/082; H04L 41/0866; H04L 41/0873; H04L 41/0893; H04L 41/0895; H04L 41/22; H04L 67/1095; H04L 67/1097
See application file for complete search history.

(56) References Cited

U.S. PATENT DOCUMENTS

| | | | |
|---|---|---|---|
| 7,058,731 B2 | 6/2006 | Kodama | |
| 7,257,689 B1 | 8/2007 | Baird | |
| 7,360,047 B2 | 4/2008 | Muto | |
| 7,457,830 B1 | 11/2008 | Coulter et al. | |
| 7,523,345 B2 | 4/2009 | Schroiff et al. | |
| 7,581,025 B2 | 8/2009 | Bartlett et al. | |
| 7,617,289 B2 * | 11/2009 | Srinivasan | H04L 67/1095 707/999.203 |
| 7,653,668 B1 | 1/2010 | Shelat et al. | |
| 7,725,658 B2 | 5/2010 | Lang et al. | |
| 7,739,677 B1 | 6/2010 | Kekre et al. | |

(Continued)

OTHER PUBLICATIONS

Schaeffer et al., "Syzygy: native PC cluster VR", Jan. 1, 2003, IEEE Virtual Reality, 2003. Proceedings. (pp. 15-22) (Year: 2003).*

*Primary Examiner* — Davoud A Zand (57) ABSTRACT

A system includes a memory and a processor. The processor is configured to determine a first cluster configuration for a particular service that is running on both a first and a second computing clusters. The first cluster configuration includes a first configuration value for configuring the particular service to run on the first computing cluster. The processor is further configured to determine a second cluster configuration for the particular service that is running on both the first and second computing clusters. The second cluster configuration includes a second configuration value for configuring the particular service to run on the second computing cluster. The first configuration value is different from the second configuration value. The processor is further configured to send one or more instructions to the second computing cluster in order to change the second configuration value to match the first configuration value.

20 Claims, 3 Drawing Sheets

(56) References Cited

U.S. PATENT DOCUMENTS

| | | | |
|---|---|---|---|
| 7,827,151 B2 | 11/2010 | Sighal et al. |
| 7,979,396 B1 | 7/2011 | Krishnamurthy et al. |
| 8,150,800 B2 | 4/2012 | Webman et al. |
| 8,335,761 B1 | 12/2012 | Natanzon |
| 8,473,582 B2 | 6/2013 | Ananthanarayanan et al. |
| 8,495,012 B2 | 7/2013 | Nagai et al. |
| 8,495,250 B2 | 7/2013 | Ananthanarayanan et al. |
| 8,504,523 B2 | 8/2013 | Starkey |
| 8,560,502 B2 | 10/2013 | Vora |
| 8,666,939 B2 | 3/2014 | O'Krafka et al. |
| 8,805,797 B2 | 8/2014 | Gunda et al. |
| 8,868,487 B2 | 10/2014 | Krishnan et al. |
| 8,904,231 B2 | 12/2014 | Coatney et al. |
| 8,935,205 B2 | 1/2015 | Hildenbrand et al. |
| 9,027,022 B2 | 5/2015 | Huetter et al. |
| 9,088,528 B2 | 7/2015 | Hara et al. |
| 9,141,685 B2 | 9/2015 | Ananthanarayanan et al. |
| 9,158,779 B2 | 10/2015 | Sudhakar |
| 9,158,788 B2 | 10/2015 | Ananthanarayanan et al. |
| 9,275,058 B2 | 3/2016 | Wehrman et al. |
| 9,280,428 B2 | 3/2016 | Ripoll |
| 9,367,410 B2 | 6/2016 | Tang et al. |
| 9,460,183 B2 | 10/2016 | Dalton |
| 9,519,657 B2 | 12/2016 | Beck |
| 9,569,475 B2 | 2/2017 | Hoang et al. |
| 9,575,975 B2 | 2/2017 | Clark et al. |
| 9,582,532 B2 | 2/2017 | Bourbonnais et al. |
| 9,619,256 B1 | 4/2017 | Natanzon et al. |
| 9,703,634 B2 | 7/2017 | Kandukuri et al. |
| 9,785,691 B2 | 10/2017 | Wong et al. |
| 9,880,753 B2 | 1/2018 | Sawicki et al. |
| 9,908,455 B2 | 3/2018 | Phelan, Jr. |
| 10,044,566 B1 * | 8/2018 | Grisco ................ H04L 43/08 |
| 10,061,666 B1 | 8/2018 | Natanzon et al. |
| 10,089,307 B2 | 10/2018 | Kousha et al. |
| 10,467,021 B2 | 11/2019 | Nguyen et al. |
| 10,489,412 B2 | 11/2019 | Isherwood et al. |
| 10,496,669 B2 | 12/2019 | Merriman et al. |
| 10,503,699 B2 | 12/2019 | Gupta et al. |
| 10,521,396 B2 | 12/2019 | Muthukkaruppan et al. |
| 10,817,478 B2 | 10/2020 | Lee et al. |
| 10,929,376 B2 | 2/2021 | Castro et al. |
| 11,140,029 B1 * | 10/2021 | Singhal ............ H04L 41/0893 |
| 2017/0034023 A1 * | 2/2017 | Nickolov ........... H04L 43/0817 |
| 2018/0309623 A1 * | 10/2018 | Szobi ................ H04L 41/0869 |

\* cited by examiner

210 — Computing Cluster A ⌄   220 — Computing Cluster B ⌄   230 — Configuration Type A ⌄

| Service 151 | Configuration ID 152 | Value (Computing Cluster A) 153 | Value (Computing Cluster B) 154 |
|---|---|---|---|
| Service 1 | Config_1 | Value 1A  250A | Value 1B  250B |
| Service 2 | Config_2 | Value 2A  250C | Value 2B  250D |
| Service 3 | Config_3 | Value 3A  250E | Value 3B  250F |

210 — Computing Cluster A ⌄   240 — Data Range ⌄   230 — Configuration Type A ⌄

| Service 151 | Configuration ID 152 | Value (Computing Cluster A) 153 | Effective Date 161 |
|---|---|---|---|
| Service 1 | Config_1 | Value 1A | Date 1B |
| Service 2 | Config_2 | Value 2A | Date 2B |
| Service 3 | Config_3 | Value 3A | Date 3B |

SYSTEMS AND METHODS FOR SYNCHRONIZING CONFIGURATIONS ACROSS MULTIPLE COMPUTING CLUSTERS

TECHNICAL FIELD

The present disclosure relates generally to computing clusters, and more specifically to systems and methods for synchronizing configurations across multiple computing clusters.

BACKGROUND

Computing clusters are utilized by many organizations to support and enable the various applications utilized by the organization. For example, a large organization may utilize dozens or even hundreds of Hadoop computing clusters in order to provide the services that enable a mobile application of the organization. Computing clusters utilize many different cluster configurations (e.g., system-level configurations and service-level configurations) to configure how the various services provided by the computing cluster are executed. Typically, it is desirable to have identical cluster configurations across all computing clusters utilized by an organization. However, due to the large number of computing clusters utilized by some organizations and the large number of cluster configurations utilized by each computing cluster, synchronization of cluster configurations across multiple computing clusters may be difficult or impossible to maintain.

SUMMARY

Computing clusters are utilized by many organizations to support and enable the various applications utilized by the organization. For example, a large organization may utilize dozens or even hundreds of Hadoop computing clusters in order to provide the services that enable a mobile application of the organization. Computing clusters utilize many different cluster configurations (e.g., system-level configurations and service-level configurations) to configure how the various services provided by the computing cluster are executed. Typically, it is desirable to have identical cluster configurations across all computing clusters utilized by an organization. However, due to the large number of computing clusters utilized by some organizations and the large number of cluster configurations utilized by each computing cluster, synchronization of cluster configurations across multiple computing clusters may be difficult or impossible to maintain.

To address these and other problems with existing cluster computing systems, this disclosure contemplates system and methods that determine and display differences in cluster configurations across multiple computing clusters and then automatically send instructions to synchronize cluster configurations across the multiple computing clusters. To do so, the disclosed embodiments receive cluster configurations (e.g., system-level configurations and service-level configurations) from multiple computing clusters. The disclosed embodiments then consolidate and refine the cluster configurations into a readable format and compare the cluster configurations in order to find any differences. In some embodiments, the cluster configurations that have different values across multiple computing clusters may be displayed in real-time on an electronic display in order to alert a user to a potential problem. In addition, certain embodiments may send instructions to one or more computing clusters in order to synchronize any cluster configurations that were found to be different. As a result, cluster configurations may be automatically synchronized across multiple computing clusters, thereby reducing wastage of overall system resources that is typical of misconfigured computing clusters.

In one embodiment, a method for automatically synchronizing configurations across multiple computing clusters includes receiving a first user selection of a first computing cluster of a plurality of computing clusters and receiving a second user selection of a second computing cluster of the plurality of computing clusters. The method further includes receiving, from the first computing cluster, a first plurality of cluster configurations. Each cluster configuration of the first plurality of cluster configurations includes a configuration value for configuring a service to run on the first computing cluster. The method further includes receiving, from the second computing cluster, a second plurality of cluster configurations. Each cluster configuration of the second plurality of cluster configurations includes a configuration value for configuring a service to run on the second computing cluster. The method further includes determining, from the first plurality of cluster configurations, a first cluster configuration for a particular service that is running on both the first and second computing clusters. The first cluster configuration includes a first configuration value for configuring the particular service to run on the first computing cluster. The method further includes determining, from the second plurality of cluster configurations, a second cluster configuration for the particular service that is running on both the first and second computing clusters. The second cluster configuration includes a second configuration value for configuring the particular service to run on the second computing cluster. The first configuration value is different from the second configuration value. The method further includes sending one or more instructions to display a cluster configuration comparison on a user device. The cluster configuration comparison includes the particular service that is running on both the first and second computing clusters, the first configuration value of the first computing cluster; and the second configuration value of the second computing cluster that is different from the first configuration value. The method further includes sending one or more synchronization instructions to the second computing cluster. The one or more synchronization instructions are operable to change the second configuration value to match the first configuration value.

A practical application of the systems and methods described herein is that cluster configurations may be automatically synchronized across multiple computing clusters. By automatically identifying and correcting configurations of a computing cluster that do not match configurations of other computing clusters, an organization's computing systems may operate more efficiently. For example, an organization's mobile applications may operate more efficiently and correctly than with misconfigured computing clusters. Another practical application is that differences in cluster configurations may be automatically identified and displayed in real-time. This may allow technicians to quickly identify and correct the incorrect cluster configurations, thereby improving the performance of applications and computer systems.

Embodiments of the present disclosure provide technological solutions to technological problems. For example, the disclosed embodiments may automatically correct misconfigured computing clusters without any interaction from personnel. As a specific example, embodiments may automatically analyze cluster configurations from multiple computing clusters in order to identify any differences in the cluster configurations. Once a difference in a cluster configuration is identified, embodiments may send synchronization instructions to a computing cluster in order to correct the cluster configuration to match other computing clusters. As a result, an organization's computing clusters may have identical configurations, thereby reducing or eliminating wastage of computing resources (e.g., computing power, memory, etc.) that is typically associated with computing clusters that have incorrect configurations (i.e., configurations that do not match other computing clusters). Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Computing clusters are utilized by many organizations to support and enable the various applications utilized by the organization. For example, a large organization may utilize dozens or even hundreds of Hadoop computing clusters in order to provide the services that enable a mobile application of the organization. Computing clusters utilize many different cluster configurations (e.g., system-level configurations and service-level configurations) to configure how the various services provided by the computing cluster are executed. Typically, it is desirable to have identical cluster configurations across all computing clusters utilized by an organization. However, due to the large number of computing clusters utilized by some organizations and the large number of cluster configurations utilized by each computing cluster, synchronization of cluster configurations across multiple computing clusters may be difficult or impossible to maintain.

To address these and other problems with existing cluster computing systems, this disclosure contemplates system and methods that determine and display differences in cluster configurations across multiple computing clusters and then automatically send instructions to synchronize cluster configurations across the multiple computing clusters. To do so, the disclosed embodiments receive cluster configurations (e.g., system-level configurations and service-level configurations) from multiple computing clusters. The disclosed embodiments then consolidate and refine the cluster configurations into a readable format and compare the cluster configurations in order to find any differences. In some embodiments, the cluster configurations that have different values across multiple computing clusters may be displayed in real-time on an electronic display in order to alert a user to a potential problem. In addition, certain embodiments may send instructions to one or more computing clusters in order to synchronize any cluster configurations that were found to be different. As a result, cluster configurations may be automatically synchronized across multiple computing clusters, thereby reducing wastage of overall system resources that is typical of misconfigured computing clusters.

Figure 1:
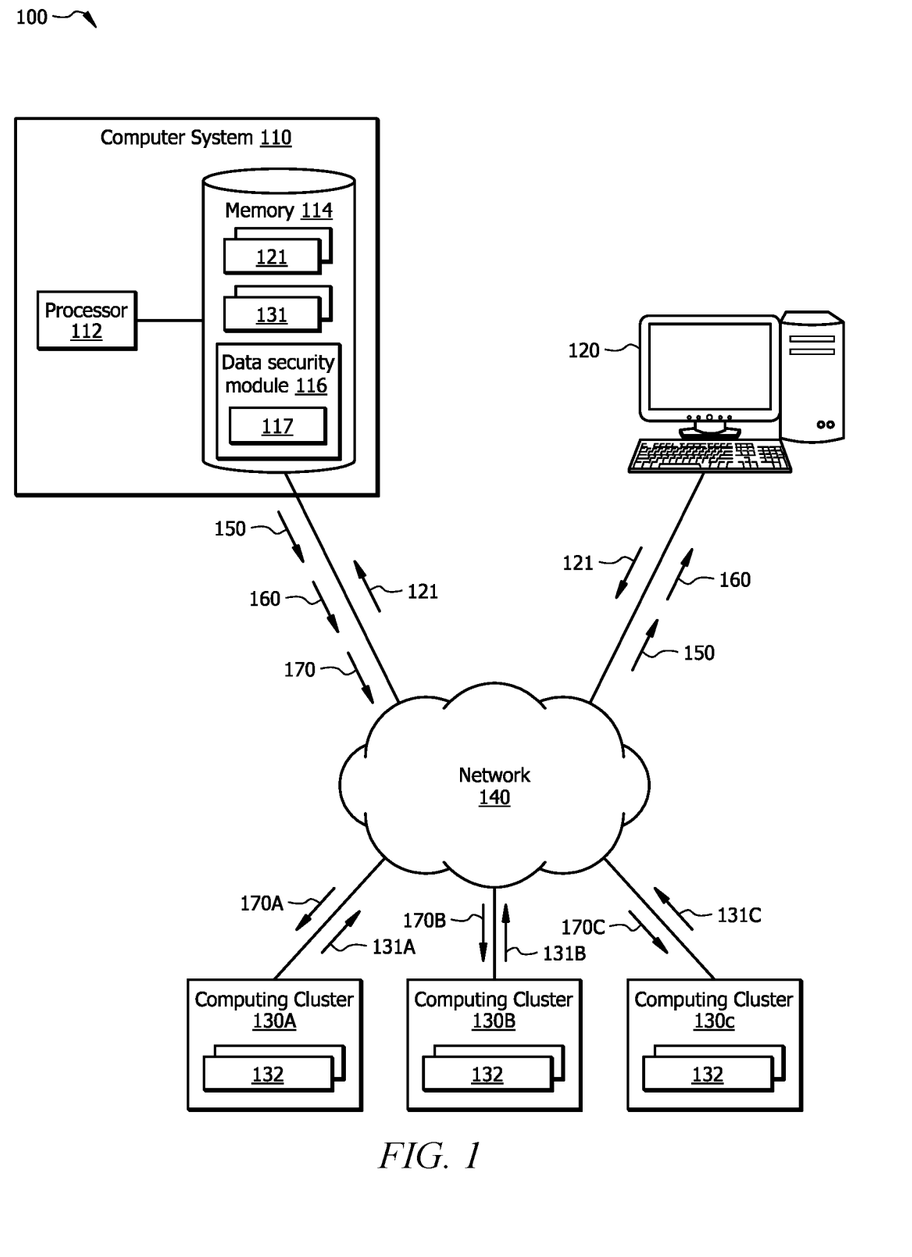
FIG. 1 is a schematic diagram of an example system for synchronizing configurations across multiple computing clusters, according to certain embodiments.
Figure 2A:
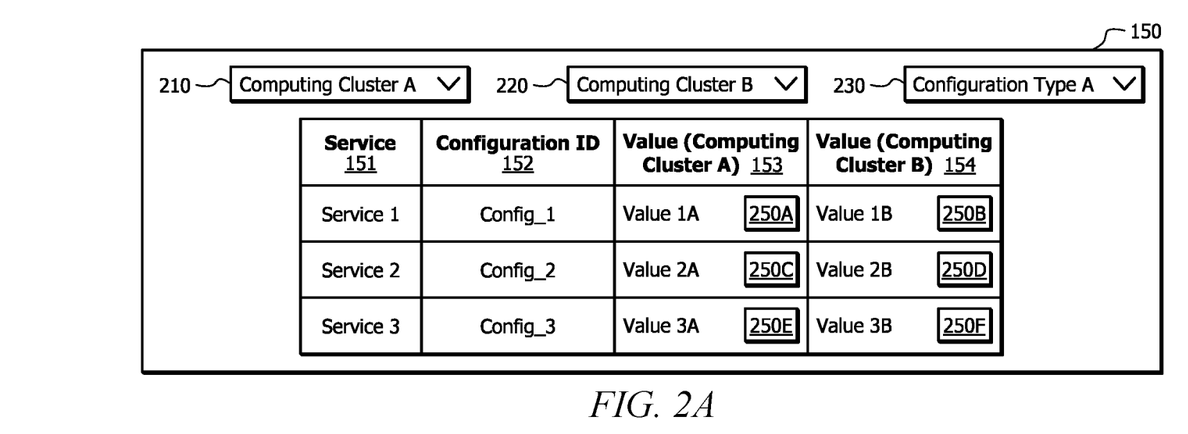
FIG. 2A illustrates an example cluster configuration comparison that may be displayed by the system of FIG. 1, according to certain embodiments.
Figure 2B:
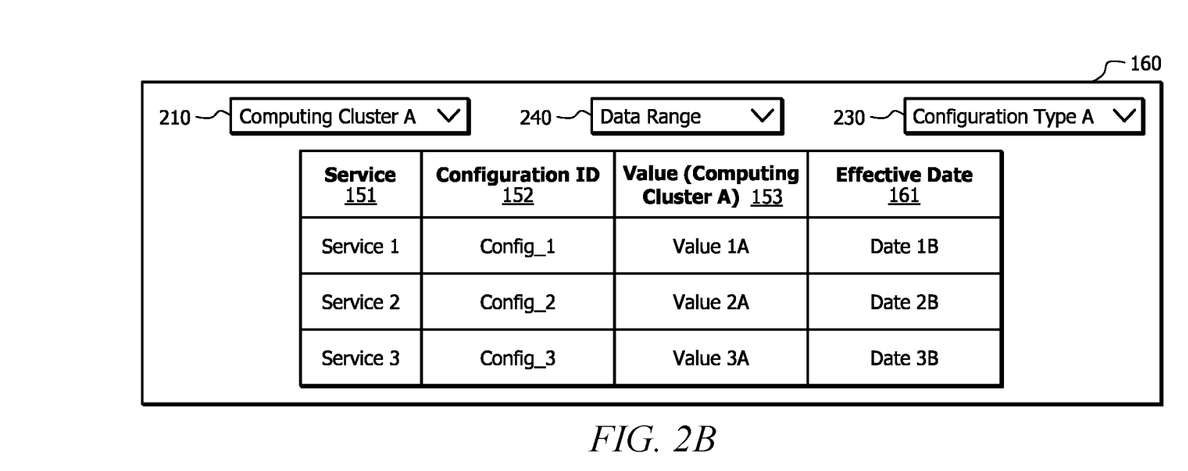
FIG. 2B illustrates an example cluster configuration history that may be displayed by the system of FIG. 1, according to certain embodiments.
Figure 3:
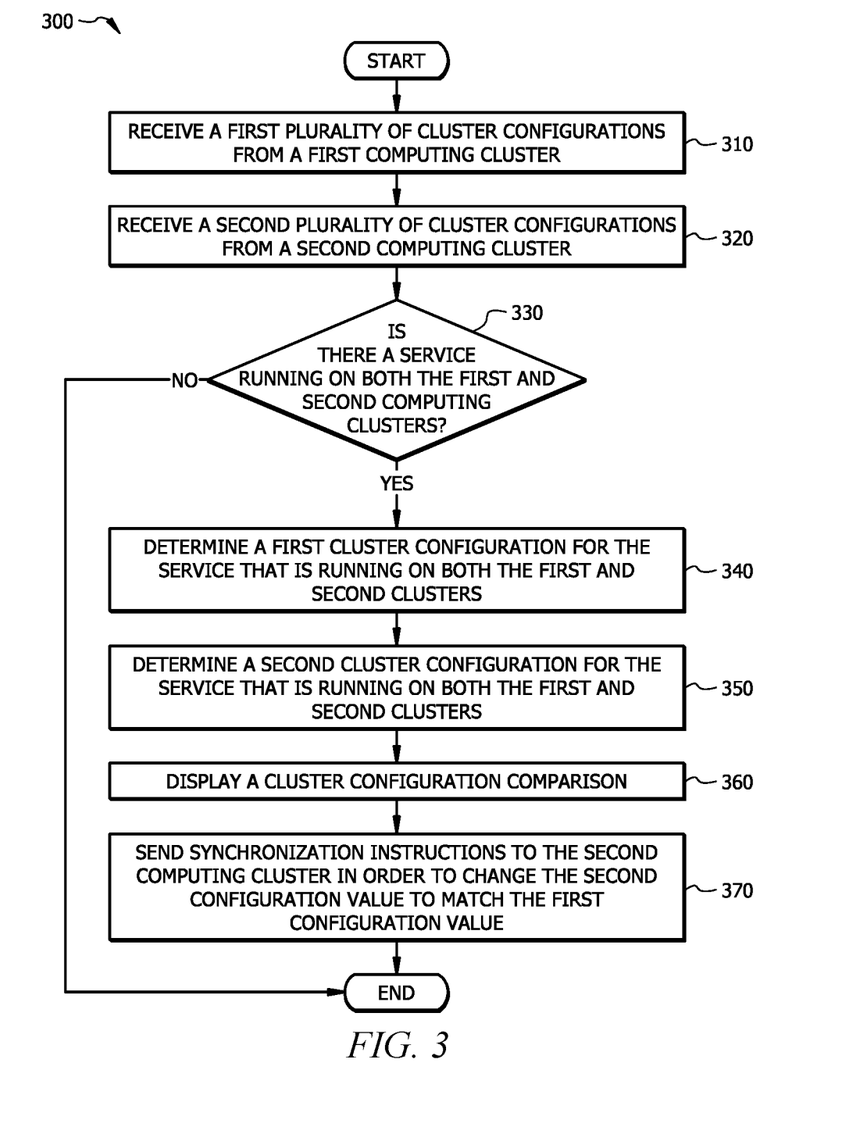
FIG. 3 is a flowchart of a method for synchronizing configurations across multiple computing clusters, according to certain embodiments.

FIGS. 1 through 3 show example systems and methods for synchronizing configurations across multiple computing clusters. FIG. 1 illustrates an example system for synchronizing configurations across multiple computing clusters. FIG. 2A illustrates an example cluster configuration comparison that may be displayed by the system of FIG. 1. FIG. 2B illustrates an example cluster configuration history that may be displayed by the system of FIG. 1. FIG. 3 illustrates an example method for synchronizing configurations across multiple computing clusters.

FIG. 1 illustrates an example configuration synchronization system 100 that synchronizes configurations across multiple computing clusters, according to certain embodiments. Configuration synchronization system 100 includes a computer system 110, a user device 120, multiple computing clusters 130 (e.g., 130A-130C), and a network 140. Computer system 110 is communicatively coupled to user device 120 and computing clusters 130 via network 140 using any appropriate wired or wireless telecommunication technology.

In general, computer system 110 of configuration synchronization system 100 displays differences in cluster configurations 131 across multiple computing clusters 130 and then takes one or more actions to automatically synchronize cluster configurations 131 across the multiple computing clusters 130. To do so, computer system 110 receives cluster configurations 131 (e.g., system-level configurations and service-level configurations) from multiple computing clusters 130. Computer system 110 then consolidates and refines the received cluster configurations 131 into a readable format and compares the cluster configurations 131 in order to find any differences. In some embodiments, the cluster configurations 131 that have different values across multiple computing clusters 130 may be displayed in real-time on an electronic display (e.g., on user device 120 or computer system 110) in order to alert a user to a potential problem. In addition, certain embodiments may automatically send synchronization instructions 170 to one or more computing clusters 130 in order to synchronize any cluster configurations 131 that were found to be different. As a result, cluster configurations 131 may be automatically synchronized across multiple computing clusters 130, thereby reducing wastage of overall system resources that is typical of misconfigured computing clusters.

Computer system 110 may be any appropriate computing system in any suitable physical form. As example and not by way of limitation, computer system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computer system 110 may include one or more computer systems 110; be unitary or distributed; span multiple locations; span multiple machines; span multiple data centers; or reside in a cloud, which may include one or more cloud components in one or more networks. Where appropriate, one or more computer systems 110 may perform without substantial spatial or temporal limitation one or more steps of one or more methods described or illustrated herein. As an example and not by way of limitation, one or more computer systems 110 may perform in real time or in batch mode one or more steps of one or more methods described or illustrated herein. One or more computer systems 110 may perform at different times or at different locations one or more steps of one or more methods described or illustrated herein, where appropriate.

Processor 112 is any electronic circuitry, including, but not limited to a microprocessor, an application specific integrated circuits (ASIC), an application specific instruction set processor (ASIP), and/or a state machine, that communicatively couples to memory 114 and controls the operation of computing system 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored in memory to perform any of the functions described herein. Processor 112 controls the operation and administration of computer system 110 by processing information received from computing clusters 130 and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, operational software such as configuration synchronization module 116, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices.

Configuration synchronization module 116 represents any suitable set of instructions, logic, or code embodied in a computer-readable storage medium. For example, configuration synchronization module 116 may be embodied in memory 114, a disk, a CD, or a flash drive. In particular embodiments, configuration synchronization module 116 may include instructions 117 (e.g., a software application) executable by processor 112 to perform one or more of the functions described herein. In general, configuration synchronization module 116 sends synchronization instructions 170 to computing clusters 130 via network 140. In addition, configuration synchronization module 116 sends cluster configuration comparison 150 and cluster configuration history 160 for display on an electronic display (e.g., on user device 120 or computer system 110).

User device 120 is any appropriate device for communicating with components of computer system 110 over network 140. For example, user device 120 may be a handheld computing device such as a smartphone, wearable computer glasses, a smartwatch, a tablet computer, a laptop computer, a desktop computer, and the like. User device 120 may include an electronic display, a processor such processor 112, and memory such as memory 114. The electronic display of user device 120 may display cluster configuration comparison 150 and cluster configuration history 160 that is provided by computer system 110.

Each computing cluster 130 is a collection of computers (i.e., nodes) that are networked together to perform parallel computations on big data sets. Computing clusters 130 are configured to store and analyze large amounts of structured and unstructured data in a distributed computing environment. In some embodiments, each computing clusters 130 is a Hadoop cluster.

Each computing clusters 130 utilizes cluster configurations 131 for configuring and controlling services 132 running on computing clusters 130. Services 132 may include, for example, HDFS, Hive, HBase, and the like. Each cluster configuration 131 may include a configuration identification (e.g., configuration identifier 152) and a value (e.g., configuration values 153 and 154) and may be associated with a particular service 132. The configuration identification and the value of the cluster configurations 131 are used by the associated service 132 and control the operation of the associated service 132. In general, it is desirable to have identical configuration values for a given configuration identification and service 132 across all computing clusters 130.

Network 140 allows communication between and amongst the various components of configuration synchronization system 100. For example, computing system 110, user device 120, and computing clusters 130 may communicate via network 140. This disclosure contemplates network 140 being any suitable network operable to facilitate communication between the components of configuration synchronization system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Synchronization instructions 170 are one or more computer instructions sent from computer system 110 to one or more computing clusters 130. In general, synchronization instructions 170 are operable to change a particular configuration value to match one or more other configuration values. For example, if computer system 110 determines that computing cluster 130A has a different configuration value for a particular service 132 than computing cluster 130B, computer system 110 may send synchronization instructions 170 to computing cluster 130A in order to change the configuration value of computing cluster 130A to match the configuration value of computing cluster 130B. As a specific example, synchronization instructions 170 may be PUT/ GET commands for a Hadoop computing cluster 130.

In operation, computer system 110 of configuration synchronization system 100 generates and sends synchronization instructions 170 to one or more computing clusters 130 in order to synchronize cluster configurations 131 across multiple computing clusters 130. To do so, certain embodiments of computer system 110 may first receive user selections 121 from user device 120. User selections 121 may indicate which computing clusters 130 to analyze. For example, a first user selection 121 may indicate to analyze computing cluster 130A and a second user selection 121 may indicate to analyze computing cluster 130B. User selections 121 may correspond to user selections 210 and 220 as illustrated in FIG. 2A and described in more detail below.

Computer system 110 may next receive cluster configurations 131 from multiple computing clusters 130. For example, if user selections 121 indicate to analyze computing clusters 130A and 130B, computer system 110 may send one or more instructions to each computing cluster 130A and 130B that cause each computing cluster 130A and 130B to send its cluster configurations 131 (i.e., 131A and 131B) to computer system 110. In other embodiments, computer system 110 may automatically and periodically send instructions to each computing cluster 130 that cause each computing cluster 130 to send its cluster configurations 131 to computer system 110 (i.e., without any user selections 121).

After receiving cluster configurations 131, certain embodiments of computer system 110 consolidate and refine the received cluster configurations 131 into a readable format. For example, certain embodiments may normalize configuration identifiers (e.g., configuration identifiers 152) in the received cluster configurations 131 and then translate names between multiple computing clusters 130. After normalizing and translating cluster configurations 131, computer system 110 may then compare the cluster configurations 131 in order to determine any differences. For example, some embodiments of computer system 110 may determine, from the received cluster configurations 131, a particular service 132 that is running on multiple computing clusters 130 (e.g., on both computing cluster 130A and 130B). Computer system 110 may then determine a configuration identifier (e.g., configuration identifier 152) that is common to multiple computing clusters 130 (e.g., both computing cluster 130A and 130B) and then determine the configuration values (e.g., configuration values 153 and 154). Computer system 110 may then compare the configuration values (e.g., configuration values 153 and 154) to determine any differences. If any differences are found in the configuration values, computer system 110 may send one or more synchronization instructions 170 in order to change the configuration value of a particular computing cluster 130 (e.g., computing cluster 130A) to match the configuration value of another computing cluster 130 (e.g., computing cluster 130B).

In some embodiments, any cluster configurations 131 that have different configuration values across multiple computing clusters 130 may be displayed in real-time on an electronic display (e.g., on user device 120 or computer system 110) in order to alert a user to a potential problem. For example, FIG. 2A illustrates an example cluster configuration comparison 150 that may be displayed by configuration synchronization system 100. In this embodiment, cluster configuration comparison 150 includes a user selection 210, a user selection 220, and a user selection 230. User selection 210 allows a user to select (e.g., from a drop-down graphical user interface element) a first computing cluster 130 to analyze. Likewise, user selection 220 allows a user to select (e.g., from a drop-down graphical user interface element) a second computing cluster 130 to analyze. User selection 230 allows a user to select (e.g., from a drop-down graphical user interface element) a type of cluster configuration (e.g., service-level configurations or system-level configurations) for computer system 110 to retrieve from the selected computing clusters 130 of user selections 210 and 220. Once a user selects options using user selections 210-230, computer system 110 may retrieve cluster configurations 131 according to the user selections. For example, if a user selects computing cluster 130A using user selection 210, computing cluster 130B using user selection 220, and configuration type "A" using user selection 230, computer system 110 may retrieve all cluster configurations 131 of type "A" from computing clusters 130A and 130B. Computer system 110 may then compare the retrieved cluster configurations 131 in order to identify differences as described above. The differences may then be displayed in cluster configuration comparison 150 as illustrated in FIG. 2A. For example, cluster configuration comparison 150 may include a service name 151, a configuration identifier 152, a configuration value 153 corresponding to the computing cluster of user selection 210, and a configuration value 154 corresponding to the computing cluster of user selection 220. As a specific example, the first row of cluster configuration comparison 150 indicates that a service 132 with a service name 151 of "SERVICE 1" is running on both computing clusters 130A and 130 and has a configuration identifier 152 of "CONFIG 1" that is associated with "SERVICE 1." Continuing this specific example, "CONFIG 1" has a value 153 of "VALUE 1A" on computing cluster 130A and a different value 154 of "VALUE 1B" on computing cluster 130B. As a result, a user may be able to quickly and in real-time observe cluster configurations 131 that have different values (e.g., 153 and 154) on different computing clusters 130 (e.g., 130A and 130B).

In some embodiments, cluster configuration comparison 150 may include a user selection 250 for changing configuration values (e.g., 153 and 154) on a specific computing cluster 130. For example, using the example above of the first row of cluster configuration comparison 150, a user may be presented with a user selection 250A and a user selection 250B. By selecting user selection 250A, a user may instruct computer system 110 to send synchronization instructions 170A to computing cluster 130A in order to change configuration value 153 to match configuration value 154. Likewise, by selecting user selection 250B, a user may instruct computer system 110 to send synchronization instructions 170B to computing cluster 130B in order to change configuration value 154 to match configuration value 153.

FIG. 2B illustrates an example cluster configuration history 160 that may be displayed by configuration synchronization system 100. Cluster configuration history 160 may be displayed on user device 120 or computer system 110. In this embodiment, cluster configuration comparison 150 includes user selection 210 for selecting a particular computing cluster 130, user selection 230 for selecting a type of cluster configuration, and a user selection 240 for selecting a date range. User selection 210 allows a user to select (e.g., from a drop-down graphical user interface element) a particular computing cluster 130 to analyze. User selection 230 allows a user to select (e.g., from a drop-down graphical user interface element) a type of cluster configuration for computer system 110 to retrieve from the selected computing cluster 130 of user selection 210 (e.g., service-level configurations or system-level configurations). User selection 240 allows a user to select (e.g., from a drop-down graphical user interface element) a date or date range. Once a user selects options using user selections 210, 230, and 240, computer system 110 may retrieve cluster configurations 131 according to the user selections. For example, if a user selects computing cluster 130A using user selection 210, configuration type "A" using user selection 230, and a particular date range using user selection 240, computer system 110 may retrieve all cluster configurations 131 of type "A" from computing cluster 130A that were changed or added during the selected date range. Computer system 110 may then display the results in cluster configuration history 160 as illustrated in FIG. 2B. For example, cluster configuration history 160 may include service name 151, configuration identifier 152, configuration value 153 corresponding to the computing cluster of user selection 210, and an effective date 161 corresponding to when the cluster configuration 131 was changed or added. As a specific example, the first row of cluster configuration history 160 indicates that a service 132 with a service name 151 of "SERVICE 1" has a configuration identifier 152 of "CONFIG 1" that is associated with "SERVICE 1." Continuing this specific example, "CONFIG 1" has a value 153 of "VALUE 1A" on computing cluster 130A and an effective date 161 of "DATE 1B." As a result, a user may be able to quickly and in real-time observe cluster configurations 131 of type "A" from computing cluster 130A that have been changed or added during a selected time frame.

FIG. 3 illustrates an example method 300 for synchronizing configurations across multiple computing clusters, according to certain embodiments. At operation 310, method 300 receives, from a first computing cluster, a first plurality of cluster configurations. Each cluster configuration of the first plurality of cluster configurations includes a configuration value for configuring a service to run on the first computing cluster. In some embodiments, the first computing cluster is computing cluster 130A, the first plurality of cluster configurations are cluster configurations 131A, the configuration value is configuration value 153, and the service is service 132.

At operation 320, method 300 receives, from a second computing cluster, a second plurality of cluster configurations. Each cluster configuration of the second plurality of cluster configurations includes a configuration value for configuring a service to run on the second computing cluster. In some embodiments, the second computing cluster is computing cluster 130B, the second plurality of cluster configurations are cluster configurations 131B, the configuration value is configuration value 153, and the service is service 132.

At operation 330, method 300 determines if a particular service is running on both the first and second computing clusters. For example, method 300 may analyze the first and second pluralities of cluster configurations received in operations 310 and 320 in order to identify any common services. In some embodiments, operation 330 includes normalizing configuration identifiers associated with the first and second cluster configurations. If method 300 determines in operation 330 that a particular service is running on both the first and second computing clusters, method 300 may proceed to operation 340. Otherwise, method 300 may end.

At operation 340, method 300 determines, by analyzing the first plurality of cluster configurations received in operation 310, a first cluster configuration for a particular service identified in operation 330 that is running on both the first and second computing clusters. The first cluster configuration includes a first configuration value for configuring the particular service to run on the first computing cluster. In some embodiments, the first configuration value is configuration value 153.

At operation 350, method 300 determine, by analyzing the second plurality of cluster configurations received in operation 320, a second cluster configuration for the particular service that is running on both the first and second computing clusters. The second cluster configuration includes a second configuration value for configuring the particular service to run on the second computing cluster. The first configuration value is different from the second configuration value. In some embodiments, the second configuration value is configuration value 154.

At operation 360, method 300 displays a cluster configuration comparison that includes the particular service that is running on both the first and second computing clusters, the first configuration value, and the second configuration value. In some embodiments, the cluster configuration comparison is cluster configuration comparison 150. In some embodiments, the cluster configuration comparison is displayed on user device 120 or computer system 110. The particular service that is running on both the first and second computing clusters may be identified by a name such a service name 151, the first configuration value may be configuration value 153, and the second configuration value may be configuration value 154.

At operation 370, method 300 sends synchronization instructions to the second computing cluster in order to change the second configuration value to match the first configuration value. In some embodiments, the synchronization instructions are synchronization instructions 170. In some embodiments, operation 370 is performed automatically (i.e., in the absence of any user synchronization instructions). In other embodiments, operation 370 is performed in response to user input (e.g., via user selection 250). After operation 370, method 300 may end.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A system comprising:
    a plurality of computing clusters, each computing cluster comprising a plurality of computing nodes configured to perform parallel computations;
    a memory configured to store:
        a first user selection of a first computing cluster of the plurality of computing clusters; and
        a second user selection of a second computing cluster of the plurality of computing clusters; and
    a processor communicatively coupled to the memory, the processor configured to:
        receive, from the first computing cluster, a first plurality of cluster configurations, wherein each cluster configuration of the first plurality of cluster configurations comprises a configuration value for configuring a service to run on the first computing cluster;
        receive, from the second computing cluster, a second plurality of cluster configurations, wherein each cluster configuration of the second plurality of cluster configurations comprises a configuration value for configuring a service to run on the second computing cluster;
        determine, from the first plurality of cluster configurations, a first cluster configuration for a particular service that is running on both the first and second computing clusters, the first cluster configuration comprising a first configuration value for configuring the particular service to run on the first computing cluster;
        determine, from the second plurality of cluster configurations, a second cluster configuration for the particular service that is running on both the first and second computing clusters, the second cluster configuration comprising a second configuration value for configuring the particular service to run on the second computing cluster, wherein the first configuration value is different from the second configuration value;
        send one or more instructions to display a cluster configuration comparison on a user device, the cluster configuration comparison comprising:
            the particular service that is running on both the first and second computing clusters;
            the first configuration value of the first computing cluster; and
            the second configuration value of the second computing cluster that is different from the first configuration value; and
        send one or more synchronization instructions to the second computing cluster, the one or more synchronization instructions operable to change the second configuration value to match the first configuration value.

2. The system of claim 1, the processor further configured to receive a third user selection of a type of cluster configuration to analyze from the first and second pluralities of cluster configurations, the type of cluster configuration comprising:
    a service-level configuration; or
    a system-level configuration.

3. The system of claim 1, wherein the plurality of computing clusters are Hadoop computing clusters.

4. The system of claim 1, wherein the cluster configuration comparison further comprises a configuration identifier that is associated with the particular service that is running on both the first and second computing cluster.

5. The system of claim 1, the processor further configured to:
    receive a third user selection of a selected computing cluster from the plurality of computing clusters; and
    send one or more instructions to display a cluster configuration history on the user device, the cluster configuration history comprising:
        a service that is running on the selected computing cluster;
        a configuration value for the service running on the selected computing cluster; and
        a date corresponding to when the configuration value for the service running on the selected computing cluster was last changed.

6. The system of claim 1, wherein determining the first cluster configuration and the second cluster configuration comprises normalizing configuration identifiers associated with the first and second cluster configurations.

7. The system of claim 1, wherein sending the one or more synchronization instructions to the second computing cluster to change the second configuration value to match the first configuration value is in response to a third user selection indicating to change the second configuration value.

8. A method comprising:
    receiving a first user selection of a first computing cluster of a plurality of computing clusters;
    receiving a second user selection of a second computing cluster of the plurality of computing clusters;
    receiving, from the first computing cluster, a first plurality of cluster configurations, wherein each cluster configuration of the first plurality of cluster configurations comprises a configuration value for configuring a service to run on the first computing cluster;
    receiving, from the second computing cluster, a second plurality of cluster configurations, wherein each cluster configuration of the second plurality of cluster configurations comprises a configuration value for configuring a service to run on the second computing cluster;
    determining, from the first plurality of cluster configurations, a first cluster configuration for a particular service that is running on both the first and second computing clusters, the first cluster configuration comprising a first configuration value for configuring the particular service to run on the first computing cluster;
    determining, from the second plurality of cluster configurations, a second cluster configuration for the particular service that is running on both the first and second computing clusters, the second cluster configuration comprising a second configuration value for configuring the particular service to run on the second computing cluster, wherein the first configuration value is different from the second configuration value;

sending one or more instructions to display a cluster configuration comparison on a user device, the cluster configuration comparison comprising:
the particular service that is running on both the first and second computing clusters;
the first configuration value of the first computing cluster; and
the second configuration value of the second computing cluster that is different from the first configuration value; and sending one or more synchronization instructions to the second computing cluster, the one or more synchronization instructions operable to change the second configuration value to match the first configuration value.

9. The method of claim 8, further comprising receiving a third user selection of a type of cluster configuration to analyze from the first and second pluralities of cluster configurations, the type of cluster configuration comprising:
a service-level configuration; or
a system-level configuration.

10. The method of claim 8, wherein the plurality of computing clusters are Hadoop computing clusters.

11. The method of claim 8, wherein the cluster configuration comparison further comprises a configuration identifier that is associated with the particular service that is running on both the first and second computing cluster.

12. The method of claim 8, further comprising:
receiving a third user selection of a selected computing cluster from the plurality of computing clusters; and
sending one or more instructions to display a cluster configuration history on the user device, the cluster configuration history comprising:
a service that is running on the selected computing cluster;
a configuration value for the service running on the selected computing cluster; and
a date corresponding to when the configuration value for the service running on the selected computing cluster was last changed.

13. The method of claim 8, wherein determining the first cluster configuration and the second cluster configuration comprises normalizing configuration identifiers associated with the first and second cluster configurations.

14. The method of claim 8, wherein sending the one or more synchronization instructions to the second computing cluster to change the second configuration value to match the first configuration value is in response to a third user selection indicating to change the second configuration value.

15. A system comprising:
a memory configured to store:
a first plurality of cluster configurations received from a first computing cluster, wherein each cluster configuration of the first plurality of cluster configurations comprises a configuration value for configuring a service to run on the first computing cluster; and
a second plurality of cluster configurations received from a second computing cluster, wherein each cluster configuration of the second plurality of cluster configurations comprises a configuration value for configuring a service to run on the second computing cluster; and
a processor communicatively coupled to the memory, the processor configured to:
determine a first cluster configuration for a particular service that is running on both the first and second computing clusters, the first cluster configuration comprising a first configuration value for configuring the particular service to run on the first computing cluster;
determine a second cluster configuration for the particular service that is running on both the first and second computing clusters, the second cluster configuration comprising a second configuration value for configuring the particular service to run on the second computing cluster, wherein the first configuration value is different from the second configuration value;
send one or more instructions to display a cluster configuration comparison on a user device, the cluster configuration comparison comprising:
the particular service that is running on both the first and second computing clusters;
the first configuration value; and
the second configuration value; and
send one or more synchronization instructions to the second computing cluster, the one or more synchronization instructions operable to change the second configuration value to match the first configuration value.

16. The system of claim 15, the processor further configured to receive a user selection of a type of cluster configuration to analyze from the first and second pluralities of cluster configurations, the type of cluster configuration comprising:
a service-level configuration; or
a system-level configuration.

17. The system of claim 15, wherein the first and second computing clusters are Hadoop computing clusters.

18. The system of claim 15, wherein the cluster configuration comparison further comprises a configuration identifier that is associated with the particular service that is running on both the first and second computing cluster.

19. The system of claim 15, the processor further configured to:
receive a user selection of a selected computing cluster from a plurality of computing clusters; and
send one or more instructions to display a cluster configuration history on the user device, the cluster configuration history comprising:
a service that is running on the selected computing cluster;
a configuration value for the service running on the selected computing cluster; and
a date corresponding to when the configuration value for the service running on the selected computing cluster was last changed.

20. The system of claim 15, wherein determining the first cluster configuration and the second cluster configuration comprises normalizing configuration identifiers associated with the first and second cluster configurations.

* * * * *